May 22, 1945.  L. McCULLOCH  2,376,794
APPARATUS FOR SEPARATING GASES FROM LIQUIDS
Filed Dec. 3, 1942
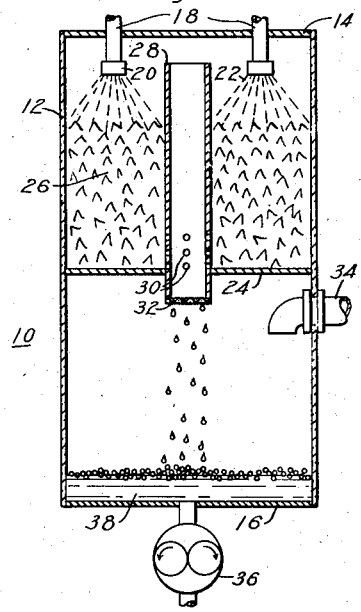
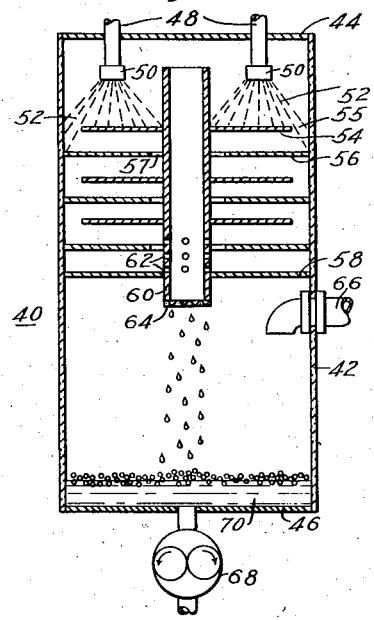
WITNESSES:
INVENTOR
Leon McCulloch.
BY
ATTORNEY Patented May 22, 1945

2,376,794

UNITED STATES PATENT OFFICE 2,376,794

APPARATUS FOR SEPARATING GASES FROM LIQUIDS

Leon McCulloch, Pittsburgh 6, Pa., assignor to Westinghouse Electric & Manufacturing Company, East Pittsburgh, Pa., a corporation of Pennsylvania Application December 3, 1942, Serial No. 467,756

2 Claims. (Cl. 183—2.5)

This invention relates to apparatus for separating gases from liquids, in particular oils and other liquids tending to excessive foaming when subjected to reduced pressures.

This invention relates to apparatus for subjecting liquids, particularly oil, to reduced pressures in order to separate therefrom absorbed, dissolved or entrained gases. For many reasons, the most economical and practical method of separating gases dissolved or absorbed in liquids is to subject the liquid to evacuation. Under these conditions, the quantity of gas which can be held in solution will be reduced, since the partial pressure of the gas determines roughly the quantity that may be held in solution. Unfortunately, liquids having certain surface properties tend to foam excessively when absorbed or dissolved gases come out of solution under conditions of diminished pressure. A great volume of foam of a relatively tenancious character is frequently produced. This volume on occasion will completely fill the apparatus in which the evacuation is being conducted, with some of the foam being drawn into the evacuating pump where damage may occur. Where the oil contains, dispersed therein, another liquid, such as water, evacuation will cause the water to vaporize and increase the tendency to foam. Breaking up the foam in order to separate the liquid from the gases is accomplished by practicing the invention disclosed herein.

The invention is particularly effective in separating gases from dielectric liquids, such as oil and halogenated hydrocarbons. In order to maintain predetermined dielectric properties, these liquid dielectrics must be relatively free from gases and dispersions of moisture.

In lubricating the bearings and seals of hydrogen cooled generators, it has been found that the lubricating oil will pick up a mixture of both hydrogen and oxygen. Since the common practice is to circulate the lubricating oils to the bearings and seals, it is advisable to remove both the hydrogen and oxygen gases from the lubricating oil before returning the oil to the bearings. There are numerous other applications in which the separation of gases from oils is beneficial. This invention lends itself to effectively treating the oils to separate any gases present therein.

The object of this invention is to provide for treating liquids to separate gases therein by means of reduced pressures without excessive foaming.

Other objects of the invention will in part be obvious and will in part appear hereinafter.

For a fuller understanding of the nature and objects of this invention, reference should be had to the accompanying drawing, in which:

Figure 1 is a vertical cross-section of one form of the invention; and

Fig. 2 is a vertical cross-section of another form of the invention.

Referring to Figure 1 of the drawing, there is illustrated the apparatus 10 for treating a liquid, such as oil, to remove any gases dissolved, absorbed or entrained therein, as well as low boiling point liquids which may be removed by evacuation. The apparatus 10 comprises an enclosed receiver 12 having an upper wall 14 and a bottom wall 16. For small installations, the receiver 12 may be made of a transparent material, such as a large diameter glass tube, or the like. In the case of apparatus suitable for treating large quantities of oil, the receiver 12 may be made of steel or other suitable metal. The construction should be capable of withstanding a high vacuum. Passing through the upper wall 14 of the receiver 12 are located one or more conduits 18 for introducing the oil or other liquid being treated. Fixed to the ends of the conduits 18 are spray or atomizing heads 20 for distributing the oil in a finely divided state 22 for most efficient operation.

Intermediate the end walls 14 and 16 of the reservoir is located a barrier or partition 24 substantially separating the upper portion of the receiver from the lower portion. Disposed on the barrier or partition 24 within the upper portion of the receiver to within a short distance of the spray heads 20 is a filling or packing characterized by a greatly extended surface with tortuous passageways therethrough. The filling 26 may consist of beads or porcelain saddles of the type employed in chemical towers or, in some cases, brickwork, or porcelain or ceramic bodies of numerous shapes. The filling 26 is so arranged that foam produced by the oil spray 22 is deposited on the filling whereby the foam and oil may be drawn through the tortuous passageways in the filling 26.

The barrier or partition 24 is provided with an open ended tube 28 of relatively small cross-sectional area whereby restricted communication is afforded between the upper portion of the receiver and the lower portion. The open upper end of tube 28 is located just above the spray 22. For a reservoir 12 of a diameter of 14 inches, the tube 28 may be from one to three inches in diameter.

The tube 28 is provided with a plurality of openings 30 just above the barrier 24 in communication with the filling 26. Oil and gases penetrating the filling 26 will escape through the openings 30 and run down the tube 28 into the lower portion of the reservoir. The lower end of the tube is preferably fitted with a coarse screen 32. In the specific example given, this screen may consist of holes of from one-eighth inch to one-quarter inch in diameter.

The lower portion of the receiver 12 is provided with an evacuating conduit 34 connected to a vacuum pump. Gases are withdrawn through the conduit 34 under the action of the vacuum pump and a predetermined reduced pressure is maintained in the lower portion of the receiver. Oil dripping from the upper portion of the receiver through the conduit 28 forms a pool 38 on the bottom wall 16 of the reservoir, from which the oil may be removed by the gear pump 36 as desired.

The apparatus is so arranged that a differential pressure is maintained by means of the restricted area tube 28 between the lower portion of the reservoir into which the vacuum conduit 34 extends and the upper portion into which the oil is sprayed. For many purposes, a differential pressure of 2 to 10 millimeters of mercury between these portions of the reservoir is sufficient to carry forward a highly efficient separation of gases from the oil. It has been found necessary that the evacuating conduit means 34 be located at a point within the lower portion of the reservoir. The differential gas pressure between the upper and lower portions and the weight of the spray and any foam produced exert a driving force tending to push the sprayed oil and foam through the filling 26. The extended surface of the filling 26 and the tortuous passages have been found to be highly effective in breaking up the foam and exposing a large surface of the oil to the reduced pressure. Gases and water are readily vaporized and separated from the oil under these conditions. As the oil collects above the baffle 24, it will seep through the openings 30 and trickle down into the lower portion of the receiver.

As the oil is sprayed at 22, it will be found that a foam is produced almost instantaneously. The foam may be several inches deep. As a rule, the colder the oil the greater the thickness of the foam. For example, at 32° C. in the set-up above disclosed, the foam was four inches high, while at 37° C. the foam height was ony one inch. Without the internal arrangement shown in the drawing, a spray head 20 operating in the large chamber filled the entire space with foam within a brief period of time, rendering it necessary to shut off the vacuum pump. A portion of the gas will escape from the sprayed oil immediately, and the gas is withdrawn through the open end of the conduit 28 directly into the lower chamber where it is removed by the vacuum conduit 34.

However a substantial portion of the gas is entrapped within the foam resting on the filling 26. This foam is forced through the packing 26 by the differential pressure and gravity, resulting in its being broken up with an effective separation of the gases from the oil. The separated oil and gases are withdrawn respectively through the openings 30 and the conduit 28, and flow into the lower portion of the receiver without any sizeable amount of foam running through. The pool of oil 38 at the bottom of the receiver may at times have a light surface layer of foam, but this condition is not harmful. In the apparatus mentioned, from one to two gallons of oil per minute have been treated, with successful and satisfactory results being obtained.

In some cases, a modified form of construction has been found to be operative as illustrated in Fig. 2 of the drawing. In this construction, the apparatus 40 comprises a receiver 42 having a lower closure 46 and an upper closure 44 through which the oil conduits 48 extend. The spray heads 50 distribute the oil in the form of a foamy spray 52 upon a series of baffles 54, 56. The baffles 54, 56 are arranged in staggered relation, whereby a tortuous passage 55, 57 is produced, forcing the oily foam to pass over large surface areas of the baffles. While only a few baffles have been shown, it is desirable to employ a great number thereof arranged in various formations, in some cases including punched holes in staggered relation, to provide a large surface area of contact with the foam. The partition 58 is disposed below the baffles 54, 56 and divides the receiver into two portions. Communication between the upper portion of the receiver and the lower portion of the receiver as defined by the partition 58 is established through the restricted conduit 60, open at the upper end and closed with a coarse screen 64 at the lower end. The openings 62 function to permit the trickling of oil and separated gases from the baffle portion to the lower portion of the receiver 42. The conduit 66 is connected to a source of vacuum, such as a vacuum pump, and withdraws gases from the receiver under a predetermined reduced pressure. Oil separated from the gases forms a pool 70 at the bottom of the reservoir and is removed by means of the gear pump 68.

It will be appreciated that in both forms of the invention, the foam produced by the spraying of the oil containing gases therein is subjected to a driving force which causes the foam to be drawn over a large surface area and through tortuous passages, thereby causing the oil and gas to separate. It has been found not sufficient to simply spray the oil against baffles or other filling unless a force preferably a gas pressure is exerted to cause all of the foam to pass regularly over this extended surface.

The device shown in the drawing has been found to function successfully with wet, cold oils which customary types of equipment have been found to be unable to handle without excessive foaming.

It will be obvious to those skilled in the art that many modifications in the type of filling and its arrangement may be effected without changing the gist of the invention.

Since certain obvious changes may be made in the above procedure and different embodiments of the invention could be made without departing from the scope thereof, it is intended that all matter contained in the above description should be considered as illustrative and not in a limiting sense.

I claim as my invention:

1. An apparatus for separating gases from oil and other liquids normally tending to foam excessively when subjected to evacuation, comprising an enclosed receiver, means for distributing the oil in a finely divided state disposed at the upper end of the receiver, a partition extending across the receiver disposed intermediate the upper and lower ends of the receiver to close off substantially the entire cross-sectional area of the receiver, a restricted passage member passing through the partition and extending to a position adjacent the oil distributing means and above the zone in which the oil is being distributed to provide for withdrawing gases liberated from the oil, a filling of members having an extended surface area and disposed to provide tortuous passages therethrough disposed above the partition and about the restricted passage member, the finely divided oil and foam being deposited upon the upper surface of the filling, the restricted passage member having openings adjacent the portion of filling immediately above the partition, the openings providing for flow of oil and gas into the restricted passage member and to the portion of the receiver below the partition, means for withdrawing gases under reduced pressure disposed in the receiver below the partition, the reduced pressure so produced being effective on the oil through the restricted passage, and means for withdrawing oil from the portion of the receiver below the partition, the apparatus being so arranged that a difference in pressure exists between the zone above the filling and the portion below the partition whereby any oil or foam impinging on the filling is forced through the tortuous passages of the filling over the extended surface and through the openings into the lower portion of the receiver, the foam thus being broken up into gas and oil for separate withdrawal.

2. An apparatus for separating gases from liquids, the apparatus being capable of effecting such separation without the application of heat to the liquid, comprising, a tank, means for supplying a liquid carrying gases therein to the upper portion of the tank, means for atomizing the liquid within the tank, a body comprising a plurality of members of extended surface area and relatively irregular passages therebetween disposed across substantially the entire cross-sectional area of the tank below said atomizing means, a restricted passage member through the body for withdrawing gases separated from the liquid on atomization, the restricted passage member having openings adjacent the end of the body remote from the atomizing means, the openings being located to allow liquid to flow therethrough into the passage of the member, the atomized liquid being deposited upon the body, means for withdrawing the gases at a reduced pressure operatively connected to the tank at a position below the body, the atomized liquid being forced over the surface area of the members of the body and through the irregular passages by the difference in pressure created by the reduced pressure means, foam formed being forced through the body and accordingly being broken down into gas and liquid, the restricted passage member and the openings therein providing the sole means for withdrawing the liquid and gases into the portion of the tank below the body.

LEON McCULLOCH.